United States Patent
Prasad et al.

(10) Patent No.: US 9,058,481 B2
(45) Date of Patent: Jun. 16, 2015

(54) SECURITY TOKEN BASED USER AUTHENTICATION IN A MULTI-TENANTED APPLICATION

(71) Applicant: Hewlett-Packard Development Company, L.P., Houston, TX (US)

(72) Inventors: Kannan Prasad, Bangalore (IN); Prabir Kumar Goswamee, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 53 days.

(21) Appl. No.: 13/755,401

(22) Filed: Jan. 31, 2013

(65) Prior Publication Data

US 2014/0215595 A1    Jul. 31, 2014

(51) Int. Cl.
  *G06F 21/41*    (2013.01)
(52) U.S. Cl.
  CPC ...................................... *G06F 21/41* (2013.01)
(58) Field of Classification Search
  USPC ............................................................ 726/8
  See application file for complete search history.

(56) References Cited

U.S. PATENT DOCUMENTS

| | | | |
|---|---|---|---|
| 8,095,969 B2 | 1/2012 | Dillaway et al. | |
| 8,181,225 B2 | 5/2012 | Hinton et al. | |
| 8,291,490 B1 | 10/2012 | Ahmed et al. | |
| 2005/0138082 A1* | 6/2005 | Rauma et al. | 707/200 |
| 2006/0218628 A1 | 9/2006 | Hinton et al. | |
| 2010/0125612 A1* | 5/2010 | Amradkar et al. | 707/802 |
| 2014/0068732 A1* | 3/2014 | Hinton et al. | 726/6 |
| 2014/0090037 A1* | 3/2014 | Singh | 726/7 |

OTHER PUBLICATIONS

ActiveReports Server-Blog, Extending ActiveReports Server for multi-tenant ad hoc reporting, Active Reports Server, Apr. 9, 2012, pp. 1-10, Grape City, Inc., Available at: <activereportsserver.com/blog/extending-activereports-server-for-multi-tenant-ad-hoc-reporting#.UOZeO-Q3tc0>.

* cited by examiner

Primary Examiner — Beemnet Dada

(57) ABSTRACT

Systems and methods for security token based user authentication in a multi-tenanted application. An access request, from a user, is received to access at least one user account associated with the user in the multi-tenanted application. Upon receiving the access request, a security token is obtained for the user from a Security Token Service (STS) system. The security token is obtained upon authentication of the user based on login credentials provided by the user. Thereafter, a plurality of user accounts associated with the security token is determined. The plurality of user accounts includes the at least one user account. Further, an access to the plurality of user accounts is provided to the user.

13 Claims, 5 Drawing Sheets

SECURITY TOKEN BASED USER AUTHENTICATION IN A MULTI-TENANTED APPLICATION

BACKGROUND

One of the popular features of software as a service (SaaS) is multi-tenancy. In a multi-tenanted application, a single application instance and a single database instance is shared between multiple tenants. A tenant is generally an organization registered as an independent entity in the multi-tenanted application. Typically, a tenant groups a number of users, who are stakeholders in the organization, and includes user accounts for the users for allowing the users to access the shared application instance and the shared database instance. If the same user is associated with multiple tenants, the user may hold multiple user accounts, typically one user account per tenant, in the multi-tenanted application.

The multi-tenanted application may offer tenant specific customizations allowing the tenants to customize their share of the application instance to fit their needs. Additionally, the multi-tenanted application may offer user specific customizations allowing the users to customize their share of the application instance. Benefits of the multi-tenanted application are usually twofold. On one hand, application deployment becomes easier as a single application instance has to be deployed, instead of hundreds or thousands. On the other hand, utilization rate of the hardware can be improved as multiple tenants share the same hardware resources. These two factors make it possible to reduce the overall costs of the application and this makes multi-tenant applications especially interesting for customers in the small and medium enterprise (SME) segment, as they often have limited financial resources and do not need the computational power of a dedicated server.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
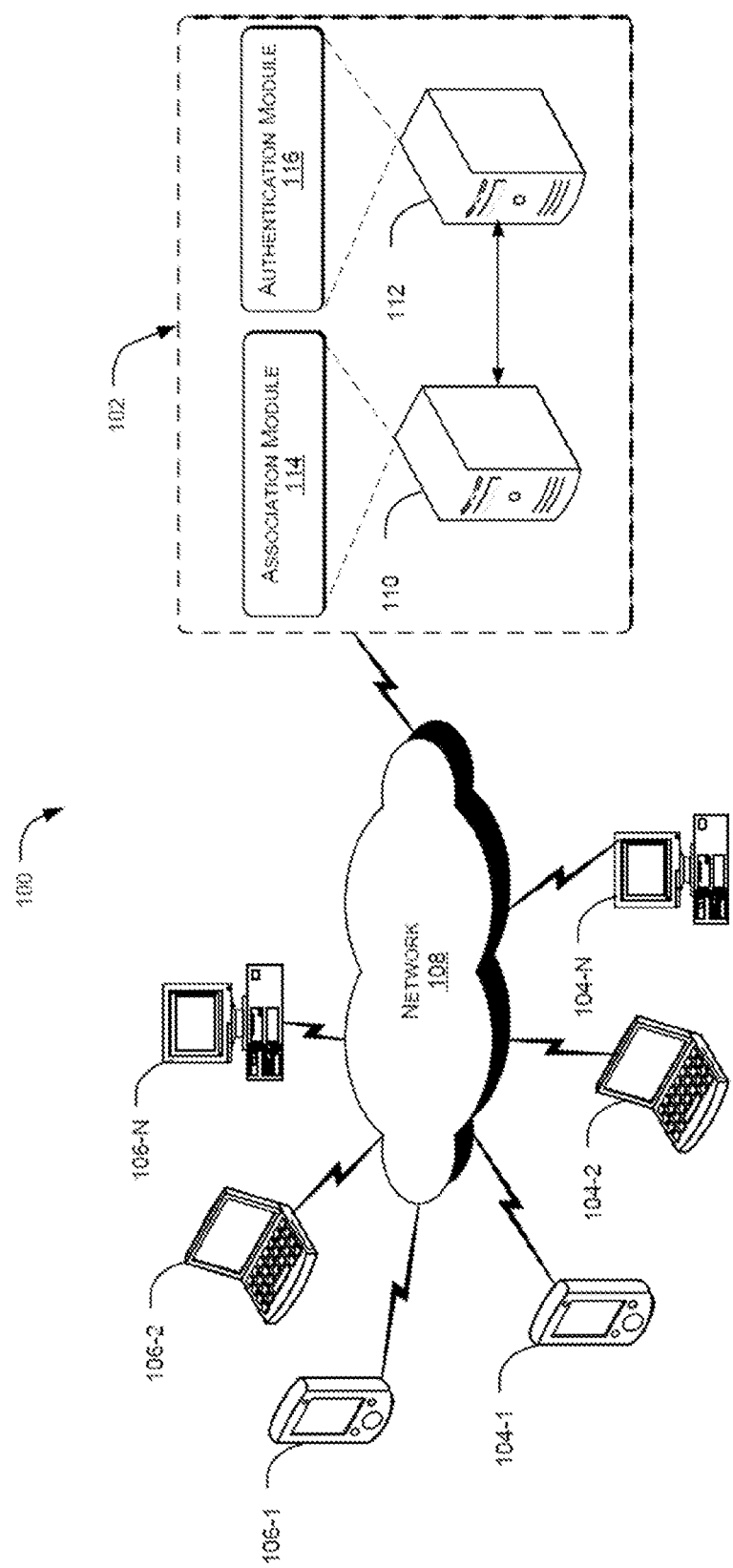
FIG. 1 schematically illustrates a network environment implementing a security token based authentication system for a multi-tenanted application, according to principles of the present subject matter.

Typically, in a multi-tenanted application, a user may often be a part of multiple tenants. Taking an example where different branches or departments of an organization, for legitimate and valid business purposes are registered as independent tenants in the multi-tenanted application, the organization may want some of its employees to have access to applications and data of different branches or departments. In said example, the organization may register such employees as users in the multi-tenanted application allowing the users to access the application instance and data of different branches. Taking another example where a conglomerate of organizations registered as tenants in the multi-tenanted application may hire or engage a common person or a team to perform services for each of the organization. In said example, the organizations may register such a common person or team as users in the multi-tenanted application.

Referring to the above cited examples, users associated with multiple tenants often experience certain issues related to accessibility. One of such issues is switching context between the tenants in the multi-tenanted application. For example, if a user accessing a share of an application instance and/or database instance of a first tenant would like to switch to a share of an application instance and/or database instance of a second tenant, the user needs to logout from his user account associated with the first tenant, and login into his user account associated with the second tenant. Switching the context further poses difficulty in handling the cache information. Another issue is managing or remembering the login credentials of the user accounts associated with different tenants. Moreover, it becomes tedious to enter and re-enter the login credentials each time a user switches the context from one tenant to another tenant. This issue multiplies if the user needs to change the passwords periodically for security reasons. To prevent security thefts and maintain confidentiality, tenants are reluctant to provide a common shared login credentials to a user for his different user accounts.

The present subject matter relates to providing a secure single login into a multi-tenanted application based on implementing a security token based authentication of the user. In accordance with the present subject matter, systems and methods for security token based authentication in a multi-tenanted application are described. The systems and the methods involve obtaining a secure token for a user based on a single login into a security token service (STS) system using a common login credentials. The obtained security token serves as an authentication stamp for the user based on which the user is allowed to access all of his user accounts in the multi-tenanted applications.

The systems and the methods involve creating a user account for a user associated with a plurality of tenants in the multi-tenanted application. In one implementation, each of the tenants may create a user account for the user in the multi-tenanted application based on user details, such as e-mail address, first name, last name, age, and employee ID of the user.

According to one aspect of the present subject matter, the tenants may assign roles to their users. The roles can be assigned either at the time of creation of the user account or after creation of the user account. Further, the roles can be assigned depending upon the nature of association between the users and the tenants. The roles assigned to a user may limit certain activities of the user while accessing the multi-tenanted application instance.

Once the user account is created in the multi-tenanted application, a security token for the user is obtained from a security token service (STS) system. The STS system is an external authentication system, which performs authentication for the multi-tenanted application. The STS system can be implemented in any computing device as is discussed later in detail. Upon authentication of the user, the STS system assigns the security token to the user so that the multi-tenanted application can identify that the user is authenticated.

The security token may be understood as an authentication code assigned to the user upon authentication of the user. The security token is different for every user. In one example, the security token can be a hexadecimal code of 16 digits, such as 0E95CD608F8C5D50.

Particularly, a security token for a user is generated when an initial user account is created for a particular user. The security token can be generated based on registering the user with the STS system upon providing user details and login credentials. The login credentials may include, for example, a username, an e-mail address, and a password. The generated security token is then stored in a database along with the user details and the login credentials of the user. Such a security token serves as an authentication stamp for the user. Next time, when an additional user account for the same user is created, the security token, for the user, can be obtained from the database once the user logs in into the STS system using the same login credentials.

The obtained security token is associated with the additional user account also. Thus, each time a new user account is created for a user, the security token for that user is obtained, and the security token is associated with the new user account. Therefore, while the security token is different for every user, the same security token is associated to the user accounts of a user. In an example, if the user has three user accounts in the multi-tenanted application, the security token "0E95CD608F8C5D50" can be associated to each of the three user accounts. Information about this association is stored in a database associated with the multi-tenanted application. The process described above is performed for all the user accounts associated with different tenants.

Whenever the user wants to access a user account in the multi-tenanted application, an access request is sent to the multi-tenanted application. The user can generate the access request by clicking on an icon provided on an interface of a user device or by pressing keys of a keyboard of the user device. The access request can be understood as a message requesting an access to the user account in the multi-tenanted application. In an example, the access request may include information about user accounts in the multi-tenanted application, which the user wants to access. Thereafter, the access request is intercepted by a web agent and is diverted to the STS system to authenticate the user. For authentication, the user is asked to login into the STS system by entering the login credentials. The login credentials entered by the user are compared with pre-stored login credentials. If a match is found, the security token for the user is retrieved. Based on the security token, all user accounts associated with the security token are retrieved from the database, and the user is provided with access to all his user accounts in the multi-tenanted application without requiring any further login and logout. In one implementation, a user's access through a particular user account may be limited by a role assigned to the user by his tenant.

The systems and the methods thus authenticate the user based on a security token that is obtained via a single login into the STS system using the common login credentials for all the user accounts. Therefore, the user does not have to remember multiple login IDs and passwords. Further, in spite of having common login credentials, the common login credentials remain undisclosed to the tenants, thereby keeping the confidentiality of the tenants intact and avoiding the chances of data thefts. Moreover, context switching from one tenant to another tenant becomes easier for the user, as the need of tedious login and logout for each of the user accounts is eliminated. Further, as the STS system is an external authentication system, the authentication process is off loaded to the external authentication system, thereby reducing load on the multi-tenanted application.

The manner in which the systems and the methods for security token based user authentication in a multi-tenanted application are carried out is explained in details by way of examples with respect to FIGS. 1 to 5. While aspects of described systems and methods for security token based user authentication in a multi-tenanted application can be implemented in any number of different computing systems, environments, and/or configurations, the embodiments are described in the context of the following system(s).

FIG. 1 schematically illustrates a network environment 100 implementing a security token based authentication system 102 for a multi-tenanted application, according to principles of the present subject matter.

In one implementation, the network environment 100 can be a public network environment, including personal computers, laptops, servers, and other computing devices. In another implementation, the network environment 100 can be a private network environment including computing devices, such as personal computers, servers, laptops, and/or communication devices, such as mobile phones and smart phones.

The security token based authentication system 102 (hereinafter referred to as a system 102) is communicatively coupled to a plurality of tenant devices 104-1, 104-2 . . . , and 104-N, collectively referred to as tenant devices 104 and individually referred to as a tenant device 104, through a network 108. The tenant device 104 may be defined as a device used by a tenant or an admin of the tenant to perform various operations in the multi-tenanted application. The tenant may access the multi-tenanted application and may create a user account for a user associated with the tenant.

Further, the system 102 is communicatively coupled to a plurality of user devices 106-1, 106-2 . . . and 106-N, collectively referred to as user devices 106 and individually referred to as a user device 106, through the network 108. The user device 106 may be defined as a device used by the user to access the plurality of user accounts in the multi-tenanted application.

The system 102 includes an application server 110 where the multi-tenanted application is hosted, and a STS system 112 for authenticating a user requesting to access the multi-tenanted application. The application server 110 and the STS system 112 can be implemented in a variety of computing devices, including, servers, and a workstation. Further, the tenant devices 104, and the user devices 106 can be implemented in a variety of computing devices, including, servers, a desktop personal computer, a notebook or portable computer, a workstation, a mainframe computer, a laptop and/or communication device, such as mobile phones and smart phones.

The system 102 may be coupled to the tenant devices 104 and the user devices 106 over the network 108 through communication links. The communication links may be enabled through a desired form of communication, for example, via dial-up modem connections, cable links, digital subscriber lines (DSL), wireless, or satellite links, or any other suitable form of communication.

The network 108 may be a wireless network, a wired network, or a combination thereof. The network 108 can also be an individual network or a collection of many such individual networks, interconnected with each other and functioning as a single large network, e.g., the Internet or an intranet. The network 108 can be implemented as one of the different types of networks, such as intranet, wide area network (WAN), and the internet. The network 108 may either be a dedicated network or a shared network, which represents an association of the different types of networks that use a variety of protocols, for example, Hypertext message Transfer Protocol (HTTP), Transmission Control Protocol/Internet Protocol (TCP/IP), etc., to communicate with each other. Further, the network 108 may include network devices, such as network switches, hubs, routers, for providing the communication links. The network devices within the network 108 may interact with the system 102, the tenant devices 104, and the user devices 106 through the communication links.

According to the present subject matter, a user may have multiple user accounts in a multi-tenanted application, where each of the user account is associated with a tenant. When the user attempts to access any of his user accounts, in the multi-tenanted application, using his user device 106, an access request is generated and sent to the application server 110 where the multi-tenanted application is hosted.

Upon receiving the access request, the application server 110 diverts the access request to the STS system 112, where the user is prompted to enter his login credentials. After obtaining the login credentials from the user, an authentication module 116 of the STS system 112 authenticates the user based on comparing the login credentials entered by the user with the pre-stored login credentials. Upon authentication of the user, the authentication module 116 retrieves a security token of the user and transmits the retrieved security token to the application server 110.

Upon receiving the security token, an association module 114 of the application server 110 determines all the user accounts associated with the security token. Further, the association module 114 provides an access to the user for accessing all the user accounts associated with the user in the multi-tenanted application. The user can therefore access all of his user accounts in the multi-tenanted application based on a single login into the STS system 112.

The manner in which the security token based user authentication in the multi-tenanted application takes place is described in greater detail with reference to the FIGS. 2-5.

Figure 2:
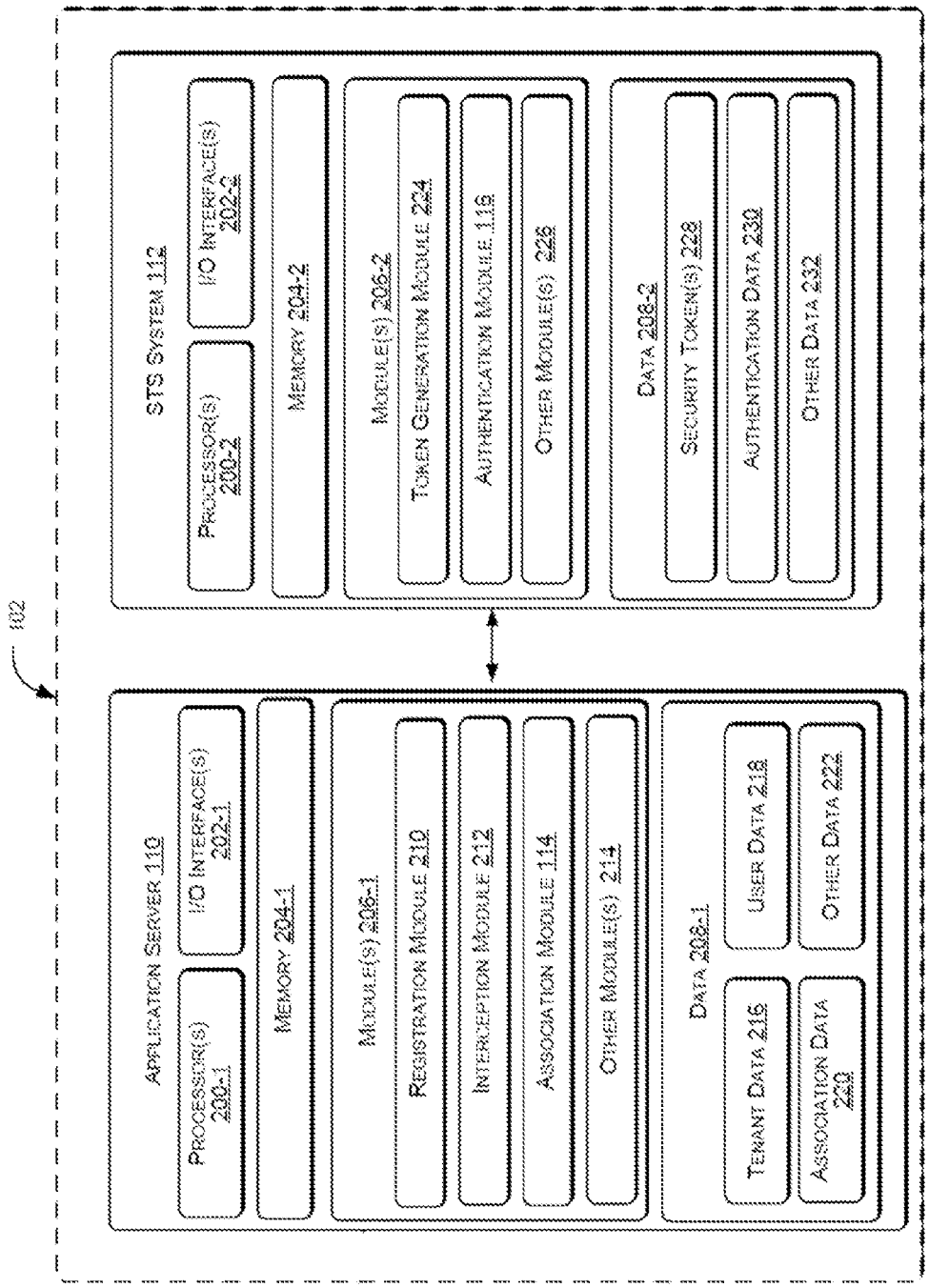
FIG. 2 illustrates components of the security token based authentication system, according to principles of the present subject matter.

FIG. 2 illustrates the components of the system 102, according to principles of the present subject matter. As described in the foregoing description, the system 102 includes the application server 110 and the STS system 112 communicatively coupled to each other for authenticating the user and providing an access to the user for accessing user accounts in the multi-tenanted application.

The application server 110 and the STS system 112 include processor(s) 200-1, 200-2, collectively referred to as processors 200 and individually referred to as a processor(s) 200. The functions of the various elements shown in the figure, including any functional blocks labeled as "processor(s)", may be provided through the use of dedicated hardware as well as hardware capable of executing computer-readable instructions.

The application server 110 and the STS system 112 also include interface(s) 202-1, 202-2, collectively referred to as interfaces 202 and individually referred to as an interface 202. The interfaces 202 may include a variety of commercially available interfaces that allow the application server 110 and the STS system 112 to interact with each other. Further, the interfaces 202 may enable the application server 110 and the STS system 112 to communicate with other communication and computing devices, such as the tenant devices 104 (shown in FIG. 1), the user device 106 (shown in FIG. 1) and other network entities on the network 108. The interfaces 202 may facilitate multiple communications within a wide variety of networks and protocol types, including wire networks, for example, LAN, cable, and wireless networks, for example, WLAN, cellular, and satellite-based network.

The application server 110 and the STS system 112 further include memory 204-1, 204-2, collectively referred to as memory 204, coupled to the processors 200-1, 200-2. The memory 204 may include any computer-readable medium known in the art including, for example, volatile memory (e.g., RAM), and/or non-volatile memory, such as read only memory (ROM), erasable programmable ROM, flash memories, hard disks, optical disks, and magnetic tapes.

Further, the application server 110 and the STS system 112, includes module(s) 206-1, 206-2 and data 208-1, 208-2, collectively referred to as modules 206 and data 208, respectively. The modules 206 include routines, programs, objects, components, data structures, and the like, which perform particular tasks or implement particular abstract data types. The modules 206 further include modules that supplement applications on application server 110 and the STS system 112, for example, modules of an operating system. The data 208 serves, amongst other things, as a repository for storing data that may be fetched, processed, received, or generated by the modules 206.

In an implementation, the modules 206-1 of the application server 110 include a registration module 210, an interception module 212, the association module 114, and other module(s) 214. In an implementation, the data 208-1 of the application server 110 includes tenant data 216, user data 218, association data 220, and other data 222. The other module(s) 214 may include programs or coded instructions that supplement applications and functions, for example, programs in the operating system of the application server 110, and the other data 222 comprise data corresponding to other module(s) 214.

Similarly, in an implementation, the modules 206-2 of the STS system 112 include a token generation module 224, the authentication module 116, and other module(s) 226. In an implementation, the data 208-2 of the STS system 112 includes security token(s) 228, authentication data 230, and other data 232. The other module(s) 226 may include programs or coded instructions that supplement applications and functions, for example, programs in the operating system of the STS system 112, and the other data 232 comprise data corresponding to other module(s) 226.

In one implementation, a tenant who wishes to create a user account for a user in the multi-tenanted application provides information, such as personal details of the user, e-mail address, first name, last name, employee ID, and roles assigned to the user in the multi-tenanted application. The registration module 210 of the application server 110 can receive this information and create a user account for the user in the multi-tenanted application. Further, the registration module 210 can assign the specified roles to a user of the user account and generate a unique identifier for the user account. The registration module 210 may retrieve the roles of the user from the tenant data 216. The tenant data 216 can include details pertaining to the tenants and roles of the user in the tenants. For example, the tenant data 216 may have details, such as a user 1 is a consultant, a user 2 is a sales manager, and a user 3 is employee. The unique identifier helps in distinguishing one user account from other user accounts created in the multi-tenanted application. The registration module 210 stores the user information along with his account details in the user data 218.

Once the user account is created, the registration module 210 can send registration data to the user. In an example, the registration module 210 sends the registration data through e-mail to the e-mail address of the user. The registration module 210, for example, retrieves the e-mail address of the user from the user data 218. The registration data may include an account activation link for activation of the user account, and the unique identifier of the user account. The unique identifier can be encrypted using an advanced encryption security (AES) encryption for security reasons. By clicking on the account activation link, the user can activate the user account in the multi-tenanted application. The registration of the user accounts is discussed in more detail with respect to FIG. 3.

Figure 3:
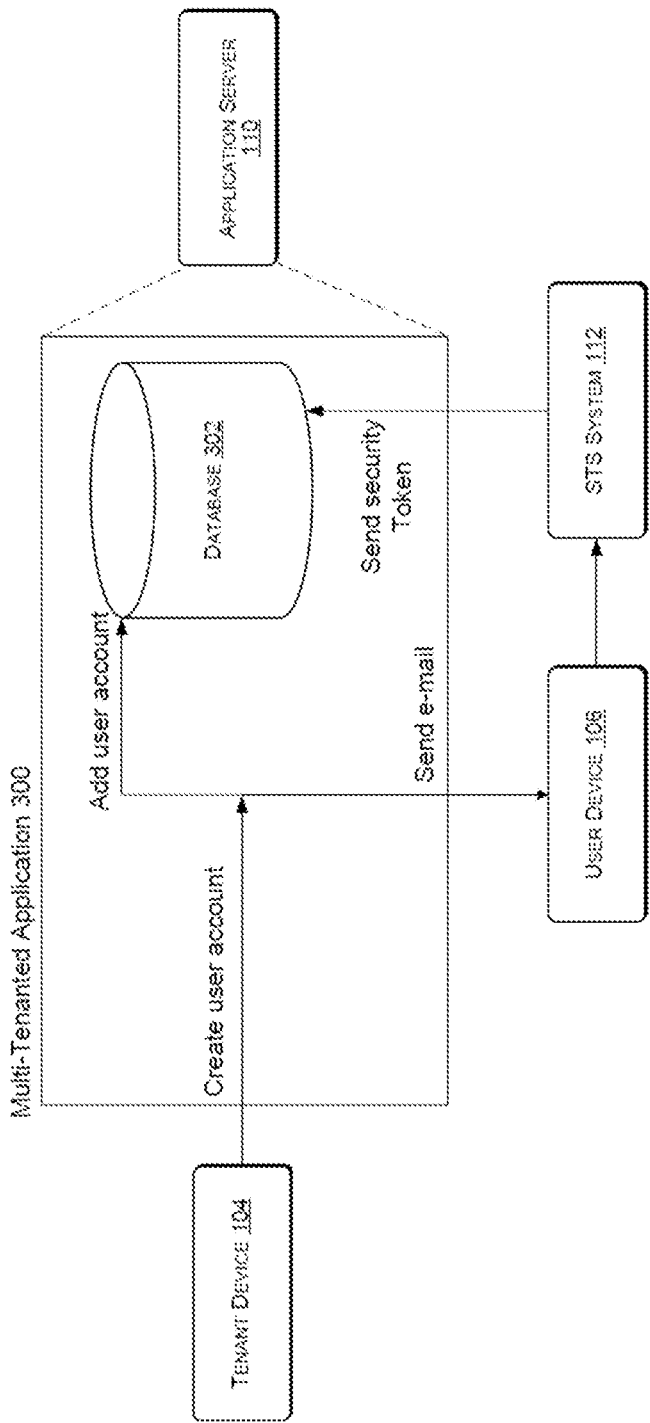
FIG. 3 illustrates a process flow of registration of user accounts in an example multi-tenanted application, according to principles of the present subject matter.

FIG. 3 illustrates a process flow of registration of user accounts in an example multi-tenanted application 300, according to principles of the present subject matter. As shown in FIG. 3, a tenant may create a user account for the user in the multi-tenanted application 300, using the tenant device 104. Once the user account is created, the user account is added into a database 302 of the multi-tenanted application 300. Subsequently, registration data is sent to the user device 106 for activation of the user account in the multi-tenanted application 300.

When the user clicks on the account activation link, an account activation request is sent to the system 102. The interception module 212 of the system 102 intercepts the account activation request and diverts the account activation request to the STS system 112. The interception module 212 referred herein may be a web agent, for example, a siteminder. The STS system 112 provides a login page to the user, where the user can enter his login credentials of the STS system 112. In an example, if the account activation request from the user is diverted to the STS system 112 for the first time, the STS system 112 may allow user to create an STS account with the STS system 112 by providing the login credentials. Subsequently, the user can login to the STS account using the same login credentials.

Thereafter, a security token is provided to the user for the user account. In case, if the user login into the STS account for the first time, the token generation module 224 of the STS system 112 generates the security token for the user. The token generation module 224 then stores the security token of the user in the security token(s) 228. Subsequently, when the user is diverted to the STS system 112, the user can provide the login credentials of the STS account for authentication. The authentication module 116 receives the login credentials provided by the user, and compares the login credentials with the pre-stored login credentials. If the entered login credentials matches with the pre-stored login credentials, the user is authenticated. The authentication module 116 then retrieves the security token of the user from the security token(s) 228, and forwards the security token in a secure cookie to the application server 110.

The interception module 212 in the application server 110 receives the secure cookie and extracts the security token from the secure cookie. Thereafter, the interception module 212 provides the security token to the association module 114. The association module 114 associates the security token with the unique identifier of the user account and stores the information about this association in the association data 220.

Referring to FIG. 3, the account activation request from the user device 106 is directed to the STS system 112. The user enters the login credentials into the STS system 112 to obtain the security token. The STS system 112 either generates the security token or retrieves the security token from the security token(s) 228 (not shown in FIG. 3) depending upon the login of the user into the STS system 112. Thereafter, the security token is forwarded to the multi-tenanted application 300, where the security token is associated with the unique identifier of the user account. The association of the security token and unique identifier is stored in the database 302 of the multi-tenanted application 300 hosted in the application server 110. Once the user accounts for the user are created in the multi-tenanted application 300, the database 302 has all the associations between the unique identifiers of the user accounts and the security token. In an example, the database 302 may have associations, such as user account1=uniqueID1 (security token), user account2=uniqueID2 (security token), and user account3=uniqueID3 (security token).

Referring to FIG. 2, when the user makes an access request to access any of his user accounts in the multi-tenanted application, the interception module 212 intercepts the access request and diverts the access request to the STS system 112. The authentication module 116 provides the login page to the user so that the user can login into the STS system 112 and get authenticated. The user can enter the login credentials in the login page of the STS account for obtaining the security token. Thereafter, the authentication module 116 receives the login credentials of the user and matches the login credentials with a pre-stored login credentials. The pre-stored login credentials are the login credentials which are stored in the authentication data 230 data of the STS system 112 when the user created the login credentials in the STS system 112.

If a match is found, the authentication module 116 retrieves the security token from the security token(s) 228 and provides the security token to the user. Thereafter, the authentication module 116 forwards the security token in the secure cookie to the application server 110. The interception module 212 extracts the security token from the secure cookie and sends the security token to the association module 114. Subsequently, the association module 114 determines a plurality of user accounts associated with the security token by matching the security token with the association data 220 in the application server 110. The plurality of user accounts is active user accounts of the user. The active user accounts may be defined as the user accounts which are activated in the multi-tenanted application. Once the user accounts are determined, the association module 114 provides an access, to the user, for accessing his user accounts. The user can perform functions in the user accounts based on the pre-assigned role(s). The pre-assigned roles are the roles assigned to user by respective tenants based on the association of the user with the tenants. The pre-assigned roles restrict the activities of the user in the user account. In an example, the user can be assigned a role of a consultant in a first tenant, a sales manger in a second tenant, and an employee in a third tenant. Therefore, the user can perform functions of the consultant in the first tenant, the sale manger in the second tenant, and the employee in the third tenant.

Figure 4:
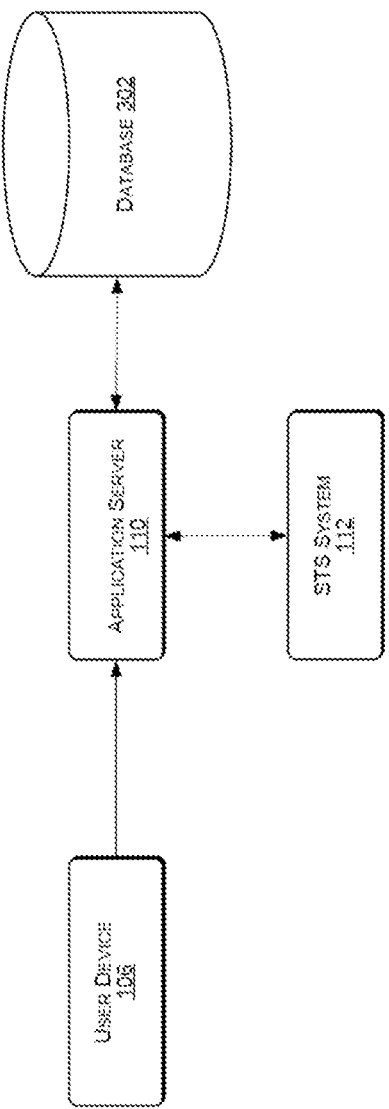
FIG. 4 illustrates a process flow of user authentication in the multi-tenanted application, according to principles of the present subject matter.

FIG. 4 illustrates a process flow of the user authentication in the multi-tenanted application, according to principles of the present subject matter. As shown in FIG. 4, when the user attempts to access the multi-tenanted application to access the user accounts, the access request of the user is diverted to the STS system 112. The STS system 112 receives the login credentials of the user to authenticate of the user. The STS system 112 matches the login credentials entered by the user with the pre-stored login credentials for the user. If a match is found, the security token of the user is retrieved and provided to the application server 110 where the multi-tenanted application is hosted. The security token serves as an authentication stamp for the user. In case, a match is not found, the authentication of the user fails and the access request of the user is discarded.

When the user is authenticated, the association module 114 identifies the user accounts associated with the security token and provide the user with the access to all his user accounts. In an example, if the association module 114 identifies that there are three user accounts associated with the security token, the association module 114 may provide the user with the access to all three user accounts in the multi-tenanted application. In one example, the user can select a default user account among the plurality of user accounts. Whenever, the user login into the multi-tenanted application, context of the default user account is displayed to the user. In said example, the user is allowed to switch to the context from the default user account to any of his other user accounts among the plurality of user accounts without any logout or login.

The association module 114 allows the user to select the default user account either automatically based on certain predefined parameters or according to the preferences or the user. In an example, the association module 114 selects the default user account based on time of creation of the user accounts. In an example, the user account having oldest date of creation may be made as the default user account. The association module 114 stores the information about date of creation and preferences of the user in the user data 218.

The user may switch the context from one user account to another user account by using a drop-down menu provided on a graphical user interface of the multi-tenanted application. The drop-down menu lists the plurality of user accounts which is available for the user to access.

In one implementation, the association module 114 dissociates or deactivates a user account associated with a tenant from the multi-tenanted application upon receiving disassociation or deactivation instructions from the tenant. For example, in cases where the user is no longer associated with the tenant, the tenant may send instructions for deactivating the user account. Upon receiving such instructions the association module 114 deactivates the user account from the multi-tenanted application. The deactivated user account is subsequently removed from the association data 220. Therefore, the plurality of user accounts, determined based on matching the security token with the association data 220, is active user accounts of the user in the multi-tenanted application.

Figure 5:
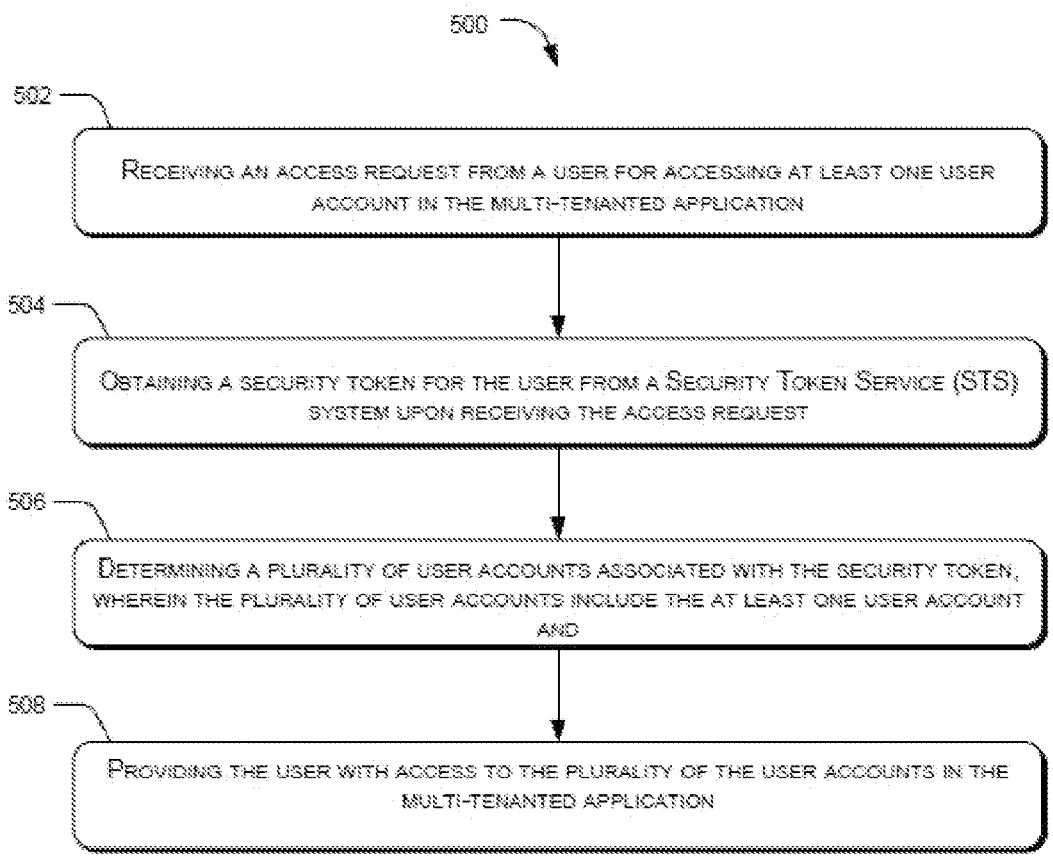
FIG. 5 illustrates a method for security token based user authentication in the multi-tenanted application, according to principles of the present subject matter.

FIG. 5 illustrates a method for security token based user authentication in a multi-tenanted application, according to principles of the present subject matter. The order in which the method 500 is described is not intended to be construed as a limitation, and any number of the described method blocks can be combined in any order to implement the method 500, or an alternative method. Additionally, some of the individual blocks may be deleted from the method 500 without departing from the spirit and scope of the subject matter described herein. Furthermore, the method 500 can be implemented in any suitable hardware, machine readable instructions, or combination thereof.

It will be recognized that steps of the method 500 can be performed by programmed computing devices. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication system configured to perform said steps of the method.

Referring to FIG. 5, at block 502, an access request is received from a user to access at least one user account in the multi-tenanted application. Whenever the user wants to access the at least one user account to which the user is associated, the user sends the access request to the multi-tenanted application.

At block 504, a security token is obtained for the user, from a security token service (STS) system upon receiving the access request from the user. The security token is obtained upon authentication of the user based on login credentials provided by the user. In one example, the access request, made by the user, has to pass through a web agent to reach the multi-tenanted application. The web agent determines whether the user is authenticated to access the at least one account in the multi-tenanted application or not. The user is considered to be authenticated, if the user is in possession of the security token. If the user is not authenticated, the web agent diverts the access request to the STS system 112 so that the security is obtained for the user. Thereafter, the user enters the login credentials into the STS system 112 to obtain the security token and get authenticated to access the at least one user account.

At block 506, a plurality of user account associated with the security token is determined. The plurality of user accounts include the at least one user accounts. The plurality of user account is the user accounts which are associated with the user and are activated in the multi-tenanted application. In an example, the security token obtained for the user is forwarded to the multi-tenanted application, where the security token is matched with the records in the database of the multi-tenanted application. Based on matching, the plurality of user accounts associated with the security token and activated in the multi-tenanted application. The user is provided access to the plurality of user accounts based on pre-assigned roles. The pre-assigned roles are the roles assigned by the tenant when the user was associated with the tenant. The tenant may also change the roles assigned to the user based on the association of the user with the tenant. The pre-assigned roles restrict the functionalities of the user in the user account. For example, if the user is a consultant in the tenant, then the user can perform functionalities of the consultant in the user account and functionalities of other roles may not be available to the user.

At block 508, an access to the plurality of user account is provided to the user in the multi-tenanted application. In an example, a drop-down menu is provided to the user to access the plurality of user accounts in the multi-tenanted application. The drop-down menu lists the plurality of user accounts. The plurality of user accounts includes the user accounts which are associated with the user and activated in the multi-tenanted application. Therefore, the user can not access the user accounts which are deactivated in the multi-tenanted application. Further, when the user is logged into the multi-tenanted application, a context of a default user account is displayed to the user. The context of the default user account can be changed to a context of another user account based on selection made by the user through the drop-down menu.

The systems and the methods of the present subject matter allow the user to access the user accounts in the multi-tenanted application by maintaining single login credentials of the STS system 112. With the present subject matter, the user need not to logout and login again to access the different user accounts in the multi-tenanted application. Further, as the STS system 112 is an external authentication system, the authentication process is off loaded to the external authentication system, thereby reducing load on the multi-tenanted application. Furthermore, the username information, such as first name, last name and address remain consistent with all the user accounts as the user accounts are registered through the STS system 112.

Although implementations for security token based user authentication in the multi-tenanted application have been described in language specific to structural features and/or methods, it is to be understood that the appended claims are not necessarily limited to the specific features or methods described. Rather, the specific features and methods are disclosed as examples of implementations for security token based user authentication in the multi-tenanted application.

We claim:

1. A computer-implemented method for security token based user authentication in a mufti-tenanted application, the method being performed by one or more processors and comprising:
   receiving an access request from a user to access at least one user account associated with a first tenant in the multi-tenanted application;
   in response to receiving the access request, obtaining a security token for the user from a Security Token Service (STS) system;
   determining a plurality of user accounts associated with the security token, the plurality of user accounts including the at least one user account, the at least one user account being a default user account among the plurality of user accounts, wherein the plurality of user accounts is associated with a respective plurality of tenants of the multi-tenanted application;
   providing the user with access to the plurality of the user accounts in the mufti-tenanted application;
   displaying context of the at least one user account, associated with the first tenant, based on the at least one user account being the default user account; and
   in response to a user selection, switching context from the default user account to a second user account, associated with a second tenant of the multi-tenanted application, among the plurality of user accounts.

2. The method of claim 1, wherein providing the user with access to the plurality of user accounts is based on pre-assigned roles, associated with the user, requiring access to the plurality of user accounts associated with the respective plurality of tenants of the multi-tenanted application.

3. The method of claim 1, wherein the STS system is external to the mufti-tenanted application, and wherein receiving the access request comprises intercepting the access request from the multi-tenanted application, and diverting the access request to the STS system to authenticate the user.

4. The method of claim 1, further comprising:
   receiving registration data, from one of a plurality of tenants of the multi-tenanted application, to register the plurality of user accounts for the user, wherein the plurality of user accounts is based on one or more pre-assigned roles requiring registration to a number of the plurality of respective tenants of the mufti-tenanted application;
   generating the security token for single login authentication of the user to access all of the plurality of user accounts; and
   associating the security token with the plurality of user accounts to register each of the plurality of user accounts with the mufti-tenanted application.

5. An application server for security token based user authentication in a mufti-tenanted application, the application server comprising:
   a processor; and
   a memory resource storing instructions that, when executed by the processor, cause the application server to:
   receive an initial access request from a user to access at least one user account associated with a first tenant in the multi-tenanted application;
   identify a number of pre-assigned roles assigned to the user, the number of pre-assigned roles requiring association with a respective plurality of tenants of the mufti-tenanted application;
   based on the number of pre-assigned roles, generate a security token to provide single-login access to a plurality of user accounts, including the at least one user account, associated with the respective plurality of tenants of the mufti-tenanted application; and
   provide the user with the security token to enable the user to access the plurality of the user accounts, via the single-login access, in the mufti-tenanted application.

6. The application server of claim 5, wherein the application server is included in a Security Token Service (STS) system, and wherein the instructions, when executed by the processor, further cause the application server to:
   store the security token in a database of the STS system.

7. The application server of claim 5, wherein the instructions, when executed by the processor, further cause the application server to:
   select the at least one user account as a default user account based on the initial access request; and
   upon a user login to the mufti-tenanted application, display context of the default user account to the user.

8. The application server of claim 6, wherein the STS system and application server are external to the mufti-tenanted application, and wherein the instructions, when executed by the processor, further cause the application server to:
   intercept a subsequent access request from the user to access the multi-tenanted application; and
   obtain the security token for the user from the database of the STS system; and
   provide the security token to the user to enable the user to access the plurality of user accounts via the single-login access.

9. The application server of claim 5, wherein the plurality of user accounts are active user accounts associated with the user.

10. The application server of claim 7, wherein the instructions, when executed by the processor, further cause the application server to:
    switch the displayed context from the default user account in the plurality of user accounts to a second user account in the plurality of user accounts based on selection by the user.

11. The application server of claim 10, wherein the instructions, when executed by the processor, further cause the application server to:
    provide a drop-down menu, comprising the plurality of user accounts, to enable the user to make the selection of the second user account.

12. The application server of claim 5, wherein the instructions, when executed by the processor, further cause the application server to:
    deactivate one or more of the plurality of user accounts based on determining that the user is no longer associated with a respective one or more of the plurality of respective tenants.

13. A non-transitory computer readable medium comprising instructions for user authentication in a mufti-tenanted application, wherein the instructions, when executed by a processor of an application server, cause the application server to:
- receive an access request from a user to access at least one user account associated with a first tenant in the multi-tenanted application;
- identify a number of pre-assigned roles assigned to the user, the number of pre-assigned roles requiring association with a respective plurality of tenants of the mufti-tenanted application;
- based on the number of pre-assigned roles, generate a security token to provide single-login access to a plurality of user accounts, including the at least one user account, associated with the respective plurality of tenants of the mufti-tenanted application; and
- provide the user with the security token to enable the user to access the plurality of the user accounts, via the single login access, in the mufti-tenanted application.

* * * * *

UNITED STATES PATENT AND TRADEMARK OFFICE
CERTIFICATE OF CORRECTION

PATENT NO. : 9,058,481 B2  
APPLICATION NO. : 13/755401  
DATED : June 16, 2015  
INVENTOR(S) : Kannan Prasad et al.

Page 1 of 1

It is certified that error appears in the above-identified patent and that said Letters Patent is hereby corrected as shown below:

In the Claims:

In column 11, line 11, in Claim 1, delete "mufti" and insert -- multi --, therefor.

In column 11, line 28, in Claim 1, delete "mufti" and insert -- multi --, therefor.

In column 11, line 42, in Claim 3, delete "mufti" and insert -- multi --, therefor.

In column 11, line 53, in Claim 4, delete "mufti" and insert -- multi --, therefor.

In column 11, line 60, in Claim 4, delete "mufti" and insert -- multi --, therefor.

In column 11, line 62, in Claim 5, delete "mufti" and insert -- multi --, therefor.

In column 12, line 7 approx., in Claim 5, delete "mufti" and insert -- multi --, therefor.

In column 12, line 13 approx., in Claim 5, delete "mufti" and insert -- multi --, therefor.

In column 12, line 16 approx., in Claim 5, delete "mufti" and insert -- multi --, therefor.

In column 12, line 28 approx., in Claim 7, delete "mufti" and insert -- multi --, therefor.

In column 12, line 32 approx., in Claim 8, delete "mufti" and insert -- multi --, therefor.

In column 12, line 67, in Claim 13, delete "mufti" and insert -- multi --, therefor.

In column 13, line 9, in Claim 13, delete "mufti" and insert -- multi --, therefor.

In column 13, line 15, in Claim 13, delete "mufti" and insert -- multi --, therefor.

In column 13, line 18, in Claim 13, delete "mufti" and insert -- multi --, therefor.

Signed and Sealed this
Fifteenth Day of March, 2016

Michelle K. Lee
*Director of the United States Patent and Trademark Office*